US012066412B2

United States Patent
Zhao et al.

(10) Patent No.: US 12,066,412 B2
(45) Date of Patent: Aug. 20, 2024

(54) CIRCULATING MULTIDIMENSIONAL LIQUID CHROMATOGRAPHY AND APPLICATION THEREOF

(71) Applicant: Sericulture & Agri-food Research Institute Guangdong Academy of Agricultural Sciences, Guangzhou (CN)

(72) Inventors: Tiantian Zhao, Guangzhou (CN); Yajun Chen, Guangzhou (CN); Yehui Zhang, Guangzhou (CN); Yousheng Zhang, Guangzhou (CN); Wenjuan Jiao, Guangzhou (CN); Weifeng Liu, Guangzhou (CN); Fang Zhou, Guangzhou (CN)

(73) Assignee: SERICULTURE & AGRI-FOOD RESEARCH INSTITUTE GUANGDONG ACADEMY OF AGRICULTURAL SCIENCES, Guangzhou (CN)

( * ) Notice: Subject to any disclaimer, the term of this patent is extended or adjusted under 35 U.S.C. 154(b) by 0 days.

(21) Appl. No.: 18/456,493

(22) Filed: Aug. 27, 2023

(65) Prior Publication Data

US 2023/0408456 A1 Dec. 21, 2023

(30) Foreign Application Priority Data

Apr. 28, 2023 (CN) .......................... 202310475119.3

(51) Int. Cl.
*G01N 30/06* (2006.01)
*G01N 30/02* (2006.01)
*G01N 30/60* (2006.01)

(52) U.S. Cl.
CPC ....... *G01N 30/06* (2013.01); *G01N 2030/027* (2013.01); *G01N 2030/6013* (2013.01)

(58) Field of Classification Search
CPC ..... G01N 2030/027; G01N 2030/6013; G01N 30/06; G01N 30/46; G01N 30/44;
(Continued)

(56) References Cited

U.S. PATENT DOCUMENTS

2006/0219638 A1* 10/2006 Watanabe ............ G01N 30/463
422/63

FOREIGN PATENT DOCUMENTS

CN 104713973 A * 6/2015
CN 104713973 A 6/2015
(Continued)

OTHER PUBLICATIONS

CNIPA, Notification of First Office Action for Chinese application CN202310475119.3, Jun. 7, 2023.
(Continued)

*Primary Examiner* — John Fitzgerald
*Assistant Examiner* — Truong D Phan
(74) *Attorney, Agent, or Firm* — Zhigang Ma

(57) ABSTRACT

The present invention discloses a circulating multidimensional liquid chromatography and application thereof. The liquid chromatography comprises an infusion device, a sampling device, a collecting-resampling device, a chromatographic column switching device and a detecting device which are connected sequentially, wherein the collecting-resampling device comprises a collecting valve and a sample ring, and the collecting valve is connected with the sample ring; the sampling device is successively connected with the collecting valve and the chromatographic column switching device; the detecting device is also connected with the collecting valve; and the collecting valve is a three-slot three-position multi-way valve. The present invention adopts the three-slot three-position multi-way valve as the collecting valve, and the creative rotor flow path design can
(Continued)

simultaneously satisfy the requirements of collection and resampling of the circulating multidimensional liquid chromatography, and greatly simplifies the hardware configuration.

5 Claims, 7 Drawing Sheets

(58) Field of Classification Search
CPC .............. G01N 30/463; G01N 30/465; G01N 30/7233; H01J 49/04
See application file for complete search history.

(56) References Cited

FOREIGN PATENT DOCUMENTS

| | | | |
|---|---|---|---|
| CN | 205844281 U | * | 12/2016 |
| CN | 113607857 A | | 11/2021 |

OTHER PUBLICATIONS

CNIPA, Notification of Second Office Action for Chinese application CN202310475119.3, Jun. 28, 2023.
CNIPA, Notification to grant patent right for Chinese application CN202310475119.3, Jul. 1, 2023.

* cited by examiner

CIRCULATING MULTIDIMENSIONAL LIQUID CHROMATOGRAPHY AND APPLICATION THEREOF

TECHNICAL FIELD

The present invention relates to the technical field of precision instrument analysis, in particular to a circulating multidimensional liquid chromatography and application thereof.

BACKGROUND

Samples are manually or automatically transferred to different dimensions of liquid chromatography for separation by multidimensional liquid chromatography. The separation capacity and resolution are much higher than those of the traditional one-dimensional liquid chromatography, and the application value of multidimensional liquid chromatography is very high in complex sample analysis such as the composition of traditional Chinese medicine and proteomic analysis. At present, the multidimensional liquid chromatography mainly includes two-dimensional liquid chromatography and three-dimensional liquid chromatography. Because each dimension of the multidimensional liquid chromatography needs to be provided with an independent liquid chromatographic pump, a chromatographic column, a detection device and the like, the cost is high. Thus, the current multidimensional liquid chromatography is mostly the two-dimensional liquid chromatography, the three-dimensional liquid chromatography is relatively rare, and four-dimensional or even five-dimensional liquid chromatography has not been reported. In addition, the high cost of hardware also plays a huge obstacle role to the popularization and the promotion of the two-dimensional liquid chromatography, and the current popularization degree of the two-dimensional liquid chromatography at home and abroad is very low.

A valve switching device is a key device of the multidimensional liquid chromatography, and plays an important role in the collection, transfer and resampling operation of components between two dimensions. As the core component of the valve switching device, a multi-way valve is a hardware basis of flow path switching between two dimensions. The multi-way valve is mainly composed of a driving motor, a fixing base, a rotor (sealing gasket) and a stator (chromatographic pipeline connector), wherein the driving motor is mainly used for driving the rotor to rotate around the fixing base and stator; the fixing base is mainly used for providing fixing measures for the components of the driving motor, the rotor and the stator; the surface of the rotor is provided with an inward concave flow slot which can be used for connecting pipeline interfaces on the corresponding stator at both ends of the flow slot; and the stator mainly provides a fixing connection interface for each liquid chromatographic pipeline and the valve switching device, is fixed with the fixing base and cannot be rotated. In the valve switching process, the rotor and the flow slot rotate accordingly, which changes the connection situation of the chromatographic pipeline mobile phase connected to the stator, and plays a role of controlling the collection and the transfer of the components between the two dimensions.

At present, most of the existing valve switching devices for the multidimensional liquid chromatography use fixed common multi-way valves, such as a five-slot two-position ten-way valve, a four-slot two-position eight-way valve, etc. The number of flow slots on the valve rotor is generally ½ of the number of stator interfaces; the working positions are generally two positions (i.e., the positive and reverse positions are switched once); and the number of interfaces is generally 8, 10 or higher, which provides a convenient connection mode for the connection of the existing two-dimensional liquid chromatography. However, this valve is expensive, and in multidimensional liquid chromatographic analysis of three dimension, four dimension or even more dimensions, one valve needs to be added for the addition of one dimension and the sudden increase of hardware cost makes the majority of scientific researchers discouraged. In addition, independent infusion pumps and detecting devices required for each dimension of the existing multidimensional liquid chromatography are also expensive, which is not conducive to the development of the multidimensional liquid chromatography.

Thus, the technical problem to be solved by those skilled in the art is how to provide a circulating multidimensional liquid chromatography having low cost, small consumption and free selection of analysis dimensions and application thereof.

SUMMARY

In order to overcome the problems of high hardware consumption, high cost, high price and great dimension limitation in the existing multidimensional liquid chromatography, the main purpose of the present invention is to provide a circulating multidimensional liquid chromatography with a three-slot three-position multi-way valve as a collecting and resampling device. This type of chromatographic system adopts circulating multidimensional analysis design, and can freely select or set analytical dimensions (such as one-dimensional, two-dimensional, three-dimensional, four-dimensional, etc.) according to the needs of sample analysis and the deployment of chromatographic columns without any hardware change and expansion of the chromatographic system, thereby not only breaking the analytical dimension limitations of the original multidimensional liquid chromatography, but also greatly reducing the hardware cost. In addition, this type of liquid chromatography adopts a special three-slot three-position ten-way valve design, which can integrate circulating multidimensional liquid chromatographic collection and resampling, thereby greatly simplifying the design and operation methods of the chromatographic system, further reducing the hardware cost, and creating favorable conditions for the development and the popularization of the multidimensional liquid chromatography.

To achieve the above purpose, the present invention adopts the following technical solution:

A circulating multidimensional liquid chromatography comprises an infusion device, a sampling device, a collecting-resampling device, a chromatographic column switching device and a detecting device which are connected sequentially;

wherein the collecting-resampling device comprises a collecting valve and a sample ring, and the collecting valve is connected with the sample ring;

the sampling device is successively connected with the collecting valve and the chromatographic column switching device;

the detecting device is also connected with the collecting valve;

the collecting valve is a three-slot three-position multi-way valve.

Further, the collecting valve is a three-slot three-position ten-way valve; a valve of the collecting valve has three working rotation positions; 10 interfaces are evenly distributed annularly on a valve stator; a rotor surface is provided with three folded or curved flow slots adjacent to each other; and the coverage range of each flow slot comprises three contiguous stator interfaces.

One end of the sample ring is connected with the stator interface not covered by the flow slots in the collecting valve, which is denoted as a first interface, and other interfaces are numbered in a clockwise direction; the other end of the sample ring is connected with a sixth interface; the sixth interface is radially corresponding to the first interface; a third interface is connected with a waste liquid outlet; a fourth interface is connected with the detecting device; an eighth interface is connected with the chromatographic column switching device; a ninth interface is connected with the sampling device; the other interfaces are closed with plugs; and if a second interface, a fifth interface, a seventh interface and a tenth interface on the ten-way valve are removed and renumbered, the three-slot three-position six-way valve of the present invention can be obtained.

Further, the infusion device is composed of a plurality of connected liquid chromatographic pumps; and the liquid chromatographic pumps are multielement high pressure pumps, unit high pressure pumps or low pressure pumps.

Further, the chromatographic column switching device comprises a column switching valve and a plurality of chromatographic columns connected thereto; and the column switching valve is connected with the eighth interface and the detecting device respectively.

Further, the column switching valve is a double-multi-position multi-way valve; the center and the edge of a valve stator are respectively provided with an interface; an annular region between the interfaces at the center and the edge of the valve stator is evenly distributed with radial inner and outer double-layer annular interfaces used for connecting both ends of the chromatographic columns respectively; and the surface of a valve rotor is respectively provided with a flow slot having the same radial distribution and capable of communicating with the stator center, the inner layer interface, the outer layer interface and the edge interface respectively, and an annular flow slot capable of always covering the edge interface in a valve rotation process.

Further, the valve stator of the column switching valve is distributed with 8 interfaces; the interface at the center of the valve stator is denoted as interface I, the interface at the edge of the valve stator is denoted as interface II, and the other interfaces are denoted as interface III-interface VIII respectively;

Wherein position 1 in the column switching valve is connected with position 8 in the collecting valve; position 2 in the column switching valve is connected with the detecting device; and the other interfaces are connected with a plurality of chromatographic columns respectively.

Further, the chromatographic columns comprise a chromatographic column X, a chromatographic column Y and a chromatographic column Z, wherein both ends of the chromatographic column X are connected with interface III and interface IV in the column switching valve respectively; both ends of the chromatographic column Y are connected with interface V and interface VI in the column switching valve respectively; and both ends of the chromatographic column Z are connected with interface VII and interface VIII in the column switching valve respectively.

Further, the chromatographic columns are low pressure liquid chromatographic columns, normal pressure liquid chromatographic columns, high pressure liquid chromatographic columns or ultrahigh pressure liquid chromatographic columns.

Further, the detecting device is an ultraviolet detecting device, a fluorescence detecting device, an evaporative light detecting device, a differential detecting device or a mass spectrometry detecting device.

When the above circulating multidimensional liquid chromatography conducts multidimensional analysis, analysis steps are as follows (taking the three-slot three-position ten-way valve as an example):

(1) when the system is in a first-dimensional chromatographic column elution state after sampling, making the collecting valve in a standby working position, pumping a mobile phase through the infusion device, flowing through the sampling device, the ninth interface and the eighth interface of the collecting valve, the interface I and the interface III of the column switching valve, a first-dimensional chromatographic column, the interface IV and the interface II of the column switching valve, the detecting device, and the fourth interface and the third interface of the collecting valve, and finally flowing to waste liquid;

(2) when the system collects the outflow components of the first-dimensional chromatographic column, rotating the collecting valve counterclockwise to a collecting working position; at this time, making the outflow liquid of the detecting device flow to the waste liquid through the fourth interface, the fifth interface, the sixth interface, the first interface, the second interface and the third interface of the collecting valve successively, and caching and collecting target components through the sample ring; after collection is completed, rotating the collecting valve clockwise to return to the standby working position, and then rotating the column switching valve clockwise until the end of the current dimensional chromatographic elution, or rotating the column switching valve clockwise immediately after the collecting valve returns to the standby working position; at this time, making the mobile phase flow through the interface I of the column switching valve and the next inner layer stator interface successively, then flow into the corresponding outer layer stator interface of the column switching valve through the next dimensional chromatographic column, and flow out through the interface II to the detecting device; and entering, by the system, a second-dimensional chromatographic column balance waiting state;

(3) when the second-dimensional chromatographic column is fully balanced, rotating the collecting valve clockwise to a resampling position; at this time, making the mobile phase at an outlet of the sampling device pass through the ninth interface, the tenth interface, the first interface, the sample ring, the sixth interface, the seventh interface and the eighth interface of the collecting valve successively; transferring the target components cached in the sample ring into the chromatographic column for second-dimensional liquid chromatographic elution analysis; after the components in the sample ring are completely transferred, rotating the collecting valve again counterclockwise to the standby working position to reduce an elution dead volume and increase elution gradient and elution efficiency; and when needing to conduct the next dimensional analysis of the outflow components of the second-dimensional chromatographic column, repeating the operation of above steps 2-3 until the multidimensional liquid chromatography analysis of the target components is completed.

The collecting valve can also be a three-slot three-position six-way valve, that is, the stator closed by the plug is directly removed on the basis of the three-slot three-position ten-way valve.

The number position of the multi-way valve is used only to indicate the connection relationship of the system, and the specific used number position may be different from the original number position supplied by the manufacturer.

The circulating multidimensional liquid chromatography of the present invention can be used for the detection of characteristic components and toxic and harmful substances, including the detection of food, drugs, biology, chemistry and other fields.

It can be known from the above technical solution that compared with the prior art, the present invention has the following beneficial effects:

(1) The present invention adopts a circulating elution mode to realize multidimensional chromatographic analysis of the target components, and the system hardware is simple in composition and high in cost performance.

(2) The circulating multidimensional liquid chromatography of the present invention has no dimensional limitation, and can complete the chromatographic analysis of one dimension, two dimension, three dimension, four dimension or even higher dimension without any modification on the hardware.

(3) The multidimensional liquid chromatography of the present invention has strong hardware compatibility, can be compatible with any type of liquid chromatographic pumps of low pressure, medium pressure, high pressure and ultrahigh pressure, and has strong flexibility in hardware composition.

(4) The present invention adopts the three-slot three-position multi-way valve as the collecting valve of the circulating liquid chromatography, and the creative rotor flow path design can simultaneously satisfy the requirements of collection and resampling of the circulating multidimensional liquid chromatography, and greatly simplifies the hardware configuration.

(5) The present invention adopts a three-slot three-position multi-way valve as the column switching valve, and one valve and one rotation can complete the switching among multiple chromatographic columns, thereby greatly simplifying the demand of column switching chromatography for expensive valves and making the operation simpler and faster.

(6) The collecting valve of the present invention is provided with a standby working position, which can effectively reduce the dead volume of elution and simultaneously crack the time limit of switching between different dimensions of chromatography, so as to create favorable conditions for efficient analysis of the target components.

(7) The circulating multidimensional chromatography of the present invention can use any HPLC, UHPLC, UPLC or other types of chromatographic columns, and has wide applicability.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the figures,

111—binary high pressure pump; 112—sampling device; 113—collecting valve; 114—sample ring; 115—double-three-position three-way valve; 116—detecting device; 117—waste liquid; 118—chromatographic column X; 119—chromatographic column Y; 120—chromatographic column Z; 121—three-slot three-position six-way valve; 122—quaternary high pressure gradient pump; 123—double-two-position two-way valve.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

A circulating multidimensional liquid chromatography that uses a three-slot three-position ten-way valve as a collecting-resampling device, as shown in FIG. 1-FIG. 4, comprises an infusion device, a sampling device, a collecting-resampling device, a chromatographic column switching device and a detecting device.

Figure 1:
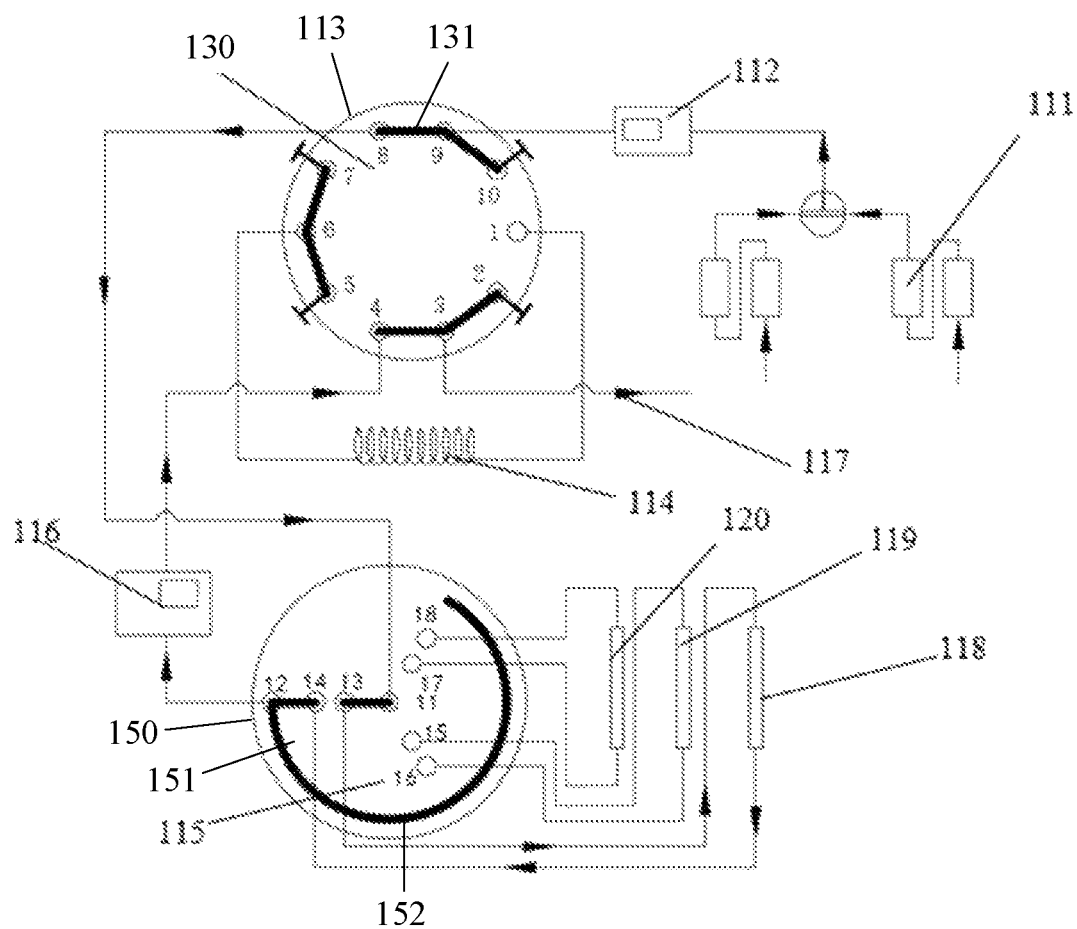
FIG. 1 shows the balance and elution states of chromatographic column X in embodiment 1.
Figure 2:
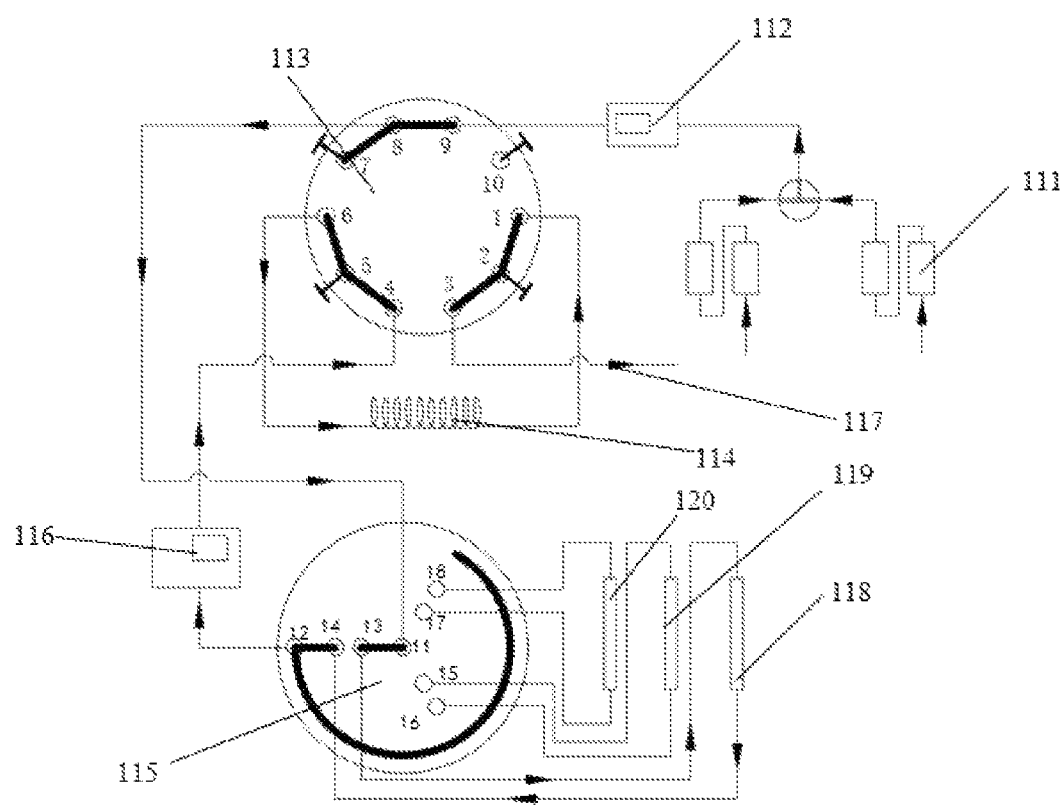
FIG. 2 shows the collection state of outflow liquid of chromatographic column X in embodiment 1.
Figure 3:
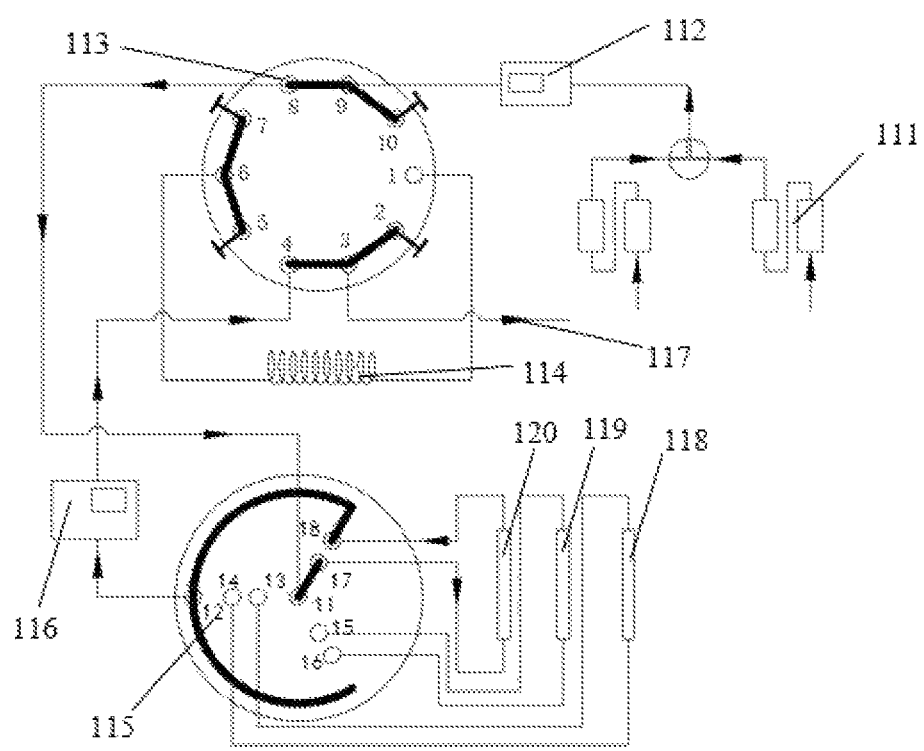
FIG. 3 shows the balance and elution states of chromatographic column Z in embodiment 1.
Figure 4:
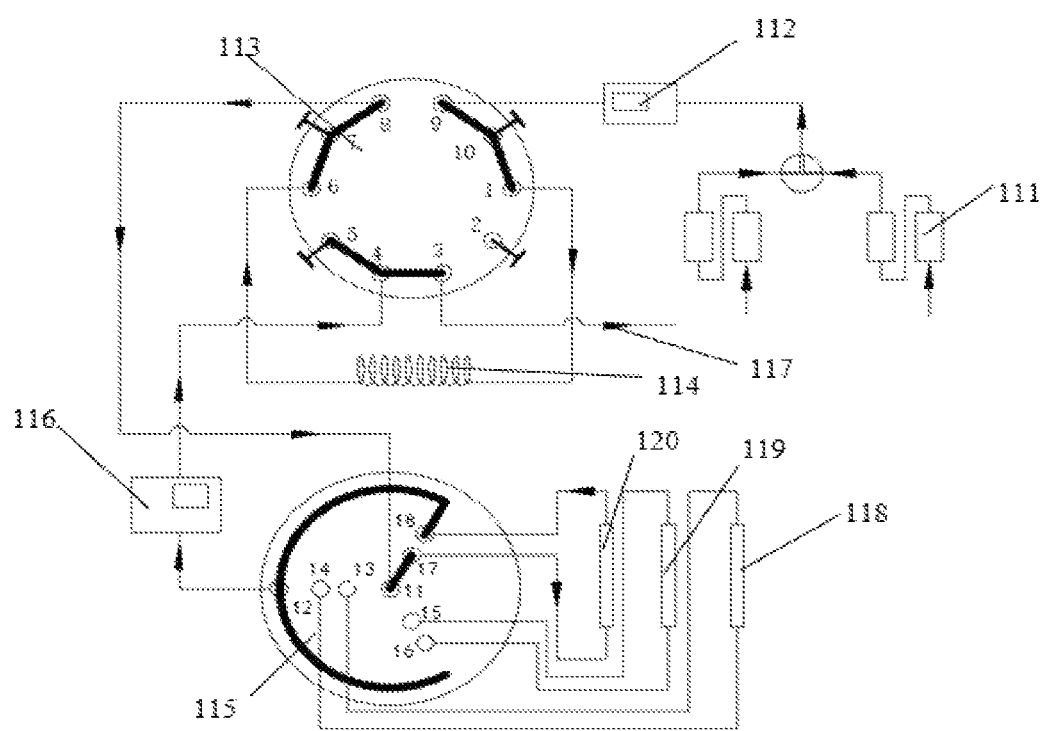
FIG. 4 shows the sampling state of chromatographic column Z in embodiment 1.

The infusion device is composed of a binary high pressure pump 111; the sampling device is an automatic sampling device 112; the collecting-resampling device is composed of a three-slot three-position ten-way valve 113 and a 500 μL sample ring 114; the chromatographic column switching device is composed of three chromatographic columns (comprising chromatographic columns X118, Y119 and Z120) and a double-three-position three-way valve 115; and the detecting device is an ultraviolet detecting device. A surface of a rotor 130 of the three-slot three-position ten-way valve 113 is provided with three folded or curved flow slots 131 adjacent to each other; and coverage range of each flow slot 131 comprises three contiguous stator interfaces (for example, as shown in FIG. 1, a first one of the three contiguous stator interfaces covers interfaces 2, 3 and 4; a second one of the three contiguous stator interface covers interfaces 5, 6 and 7; and a third one of the three contiguous stator interface covers interfaces 8, 9 and 10). Center and edge of a valve stator 150 of the double-three-position three-way valve 115 are respectively provided with a center interface 11 and an edge interface 12, respectively; an annular region between the interfaces at the center and the edge of the valve stator is evenly distributed with inner interfaces 13, 15 and 17, and outer interfaces 14, 16, 18 used for connecting both ends of the chromatographic columns respectively; and the surface of a valve rotor 151 is respectively provided with an annular flow slot 152 coaxially arranged with the center of the valve stator 150 and communicated with the center interface 11, one of the inner interface 13, 15, 17, one of the outer interfaces 14, 16, 18, and the edge interface 12, respectively, and the flow slot 152 is configured to be capable of keeping covering the edge interface 12 during a rotation process of the valve rotor 151. The implementation steps of multidimensional liquid chromatographic analysis are as follows:

(1) As shown in FIG. 1, both ends of the sample ring 114 are respectively connected with the stator interface (position 1) not covered by the flow slot and the radial corresponding interface (position 6) in the three-slot three-position ten-way valve 113; positions 3 and 4 are respectively connected with an outlet pipe of waste liquid 117 and an outflow pipe of the detecting device 116; positions 8 and 9 are connected with position 1 of the double-three-position three-way valve 115 and an outlet pipe of the sampling device 112 respectively; other number positions (positions 2, 5, 7 and 10) of the three-slot three-position ten-way valve 113 are closed with plugs; position 12 of the double-three-position three-way valve 115 is connected with an inflow pipe of the detecting device, and the radial double-layer inner and outer interfaces, positions 13 and 14, positions 15 and 16 and positions 17 and 18 of the double-three-position three-way valve 115 are connected with both ends of the chromatographic columns X118, Y119 and Z120 respectively;

when the system is in a first-dimensional chromatographic column X elution state after sampling (FIG. 1), the three-slot three-position ten-way valve 113 is in a standby working position; at this moment, the mobile phase is pumped through a binary high pressure pump 111, flows through the sampling device 112, position 9 and position 8 of the three-slot three-position ten-way valve 113, position 11 and position 13 of the double-three-position three-way valve 115, a first-dimensional chromatographic column, position 14 and position 12 of the double-three-position three-way valve 115, the detecting device 116, and position 4 and position 3 of the three-slot three-position ten-way valve 113, and finally flows to waste liquid 117;

(2) when the system collects the outflow components of the chromatographic column X118, the three-slot three-position ten-way valve 113 is rotated counterclockwise to a collecting working position (FIG. 2); at this time, the outflow liquid of the detecting device 116 flows to the waste liquid 117 through positions 4, 5, 6, 1, 2 and 3 of the three-slot three-position ten-way valve 113 successively, and target components are cached and collected through the sample ring 114; after collection is completed, the three-slot three-position ten-way valve 113 is rotated clockwise to return to the standby working position, and then the double-three-position three-way valve 115 is rotated clockwise after the end of the current chromatographic column elution; at this time, the mobile phase flows through position 11 and position 17 of the double-three-position three-way valve 115 successively, then flows into position 18 of the double-three-position three-way valve 115 through the chromatographic column Z120, and flows out through position 12 to the detecting device 116; and the system enters a balance waiting state of the chromatographic column Z120 (FIG. 3);

(3) when the chromatographic column Z120 is fully balanced, the three-slot three-position ten-way valve 113 is rotated clockwise to a resampling position (FIG. 4); at this time, the mobile phase at an outlet of the sampling device 112 passes through position 9, position 10, position 1, the sample ring, position 6, position 7 and position 8 of the three-slot three-position ten-way valve 113 successively; the target components cached in the sample ring 114 are transferred into the chromatographic column Z120 for second-dimensional chromatographic elution analysis; after the components in the sample ring 114 are completely transferred, the three-slot three-position ten-way valve 113 is rotated again counterclockwise to the standby working position (FIG. 3) to reduce a dead volume of the system and increase the elution efficiency of the system.

Embodiment 2

Figure 5:
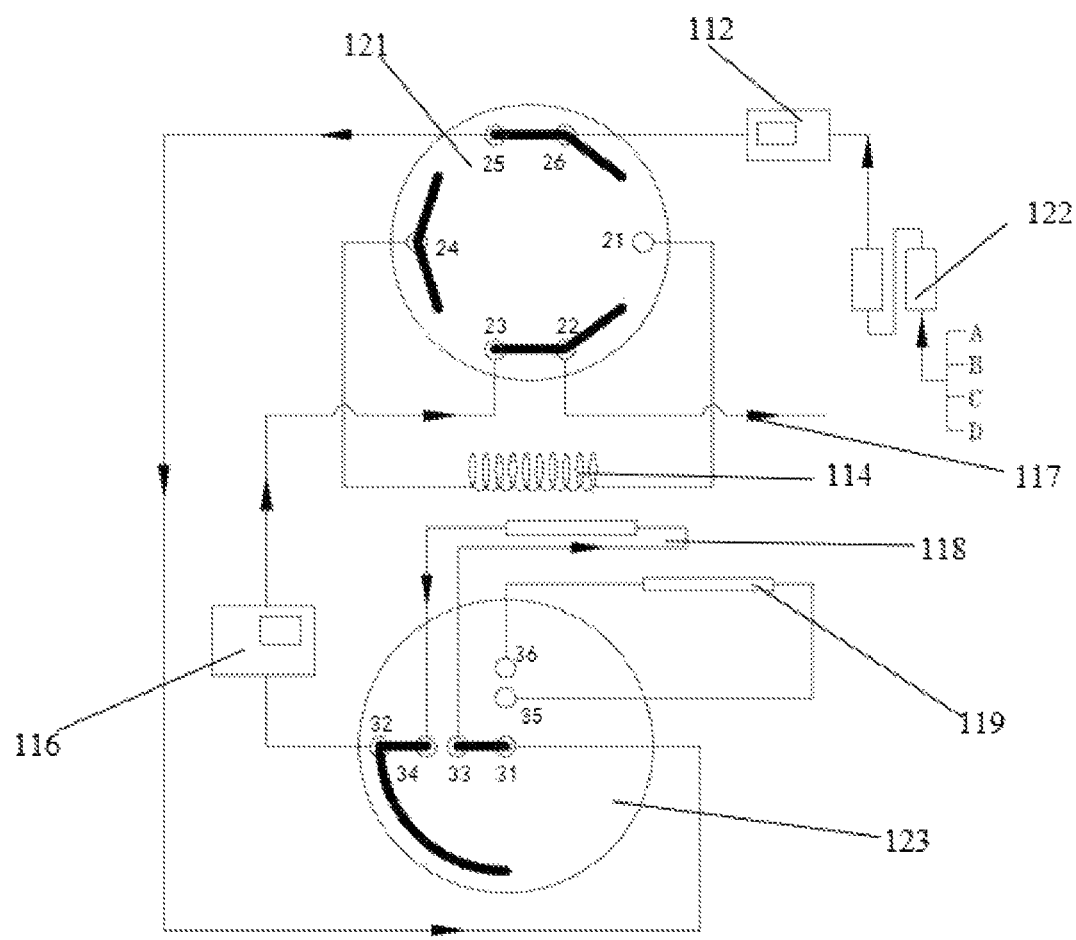
FIG. 5 shows the balance and elution states of chromatographic column X in embodiment 2.
Figure 6:
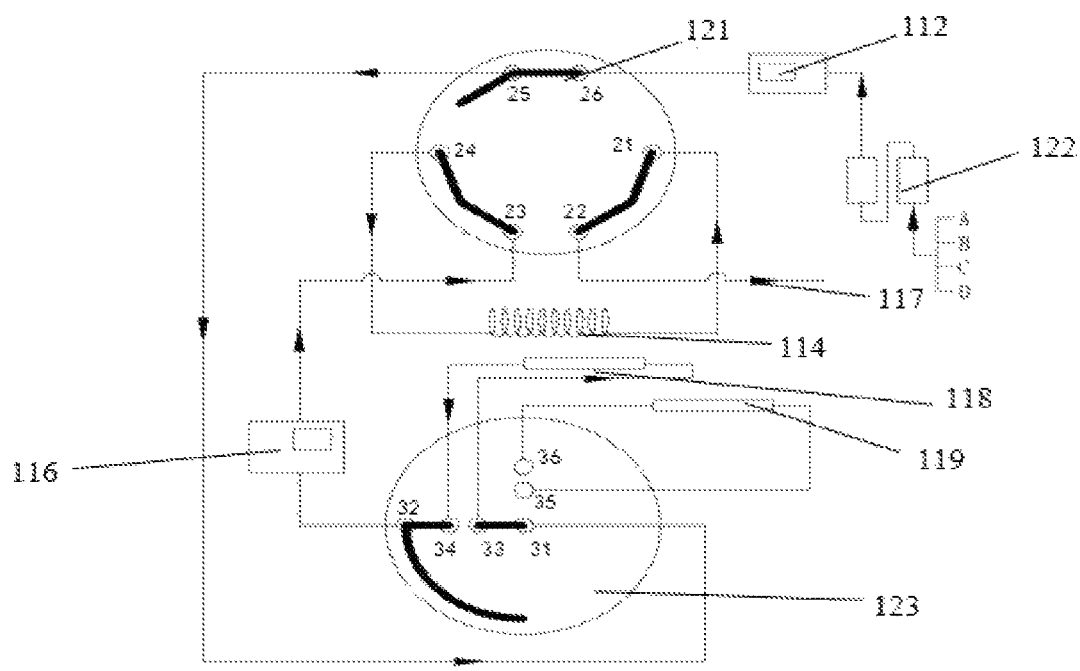
FIG. 6 shows the collection state of outflow components of chromatographic column X in embodiment 2.
Figure 7:
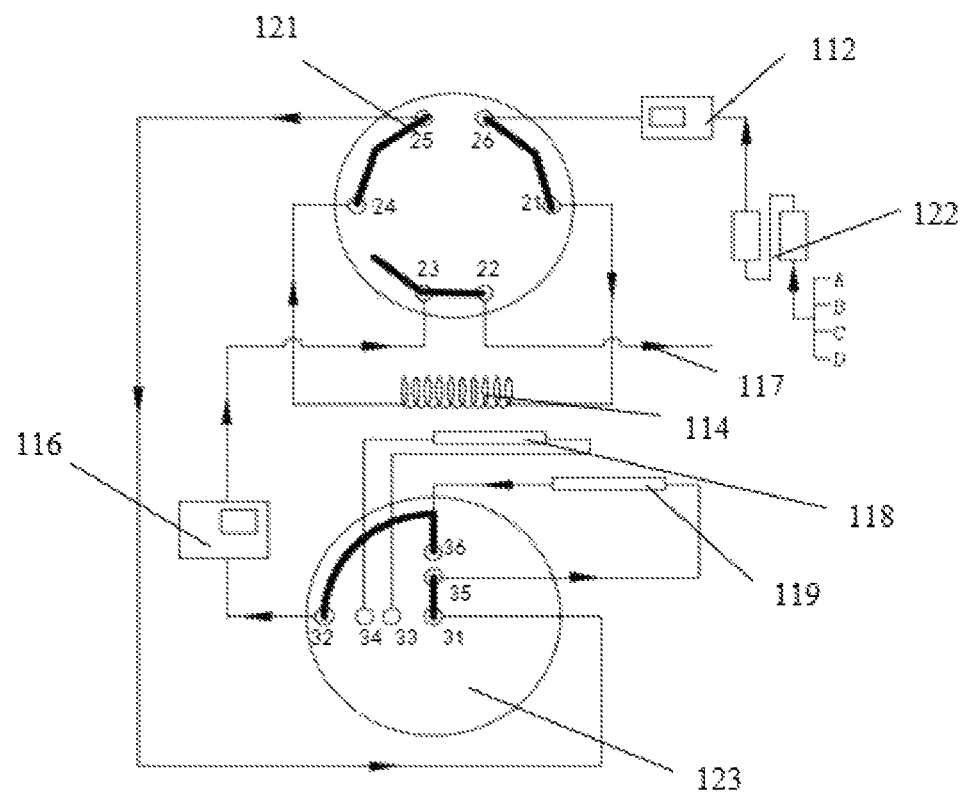
FIG. 7 shows the sampling state of chromatographic column Y in embodiment 2.

A circulating multidimensional liquid chromatography that uses a three-slot three-position six-way valve as a collecting-resampling device, as shown in FIG. 5-FIG. 7, comprises an infusion device, a sampling device, a collecting-resampling device, a chromatographic column switching device and a detecting device.

The infusion device is composed of a quaternary high pressure gradient pump 122; the sampling device is an automatic sampling device 112; the collecting-resampling device is composed of a three-slot three-position six-way valve 121 and a 500 μL sample ring 114; the chromatographic column switching device is composed of two chromatographic columns (comprising chromatographic columns X: Protein BEH SEC 4.6×150 mm and Y: BEH C18 2.1×50 mm) and a double-two-position two-way valve 123; and the detecting device is an ultraviolet detecting device 116 with wavelength set as 220 nm. The implementation steps of multidimensional liquid chromatographic analysis are as follows:

(1) As shown in FIG. 5, both ends of the sample ring 114 in the collecting-resampling device of the chromatographic system are respectively connected with the stator interface (position 21) not covered by the flow slot and the radial corresponding interface (position 24) in the three-slot three-position six-way valve 121; positions 22 and 23 are respectively connected with an outlet pipe of waste liquid and an outflow pipe of the detecting device 6; positions 25 and 26 are connected with position 31 of the double-two-position two-way valve 123 and an outlet pipe of the sampling device 112 respectively; position 32 of the double-two-position two-way valve 123 is connected with an inflow pipe of the detecting device 116; and positions 33 and 34 and positions 35 and 36 of the radial double-layer inner and outer interfaces of the double-two-position two-way valve 123 are connected with both ends of the chromatographic columns X118 and Y119 respectively;

when the system is in a first-dimensional chromatographic column X118 elution state after sampling (FIG. 5), the three-slot three-position six-way valve 121 is in a standby working position; at this moment, the mobile phase is pumped through the quaternary high pressure gradient pump 122, flows through the sampling device 112, position 26 and position 25 of the three-slot three-position six-way valve 121, position 31 and position 33 of the double-two-position two-way valve 123, a first-dimensional chromatographic column, position 34 and position 32 of the double-two-position two-way valve 123, the detecting device 116, and position 23 and position 22 of the three-slot three-position six-way valve 121, and finally flows to waste liquid 117;

(2) when the system collects the outflow components of the chromatographic column X118, the three-slot three-position six-way valve 121 is rotated counterclockwise to a collecting working position (FIG. 6); at this time, the outflow liquid of the detecting device 116 flows to the waste liquid 117 through positions 24, 23, 21 and 22 of the three-slot three-position six-way valve 121 successively, and target components are cached and collected through the sample ring 114; after collection is completed, the three-slot three-position six-way valve 121 is rotated clockwise to return to the standby working position, and the double-two-position two-way valve 123 is rotated clockwise immediately; at this time, the mobile phase flows through position 31 and position 35 of the double-two-position two-way valve 123 successively, then flows into position 36 of the double-two-position two-way valve 123 through the chromatographic column Y119, and flows out through position 32 to the detecting device 116; and the system enters a balance waiting state of the chromatographic column Y119;

(3) when the chromatographic column Y119 is fully balanced, the three-slot three-position six-way valve 121 is rotated clockwise to a resampling position (FIG. 7); at this time, the mobile phase at an outlet of the sampling device 112 passes through position 26, position 21, the sample ring 114, position 24 and position 25 of the three-slot three-position six-way valve 121 successively; the target components cached in the sample ring 114 are transferred into the chromatographic column Y119 for second-dimensional chromatographic elution analysis; after the components in the sample ring 114 are completely transferred, the three-slot three-position six-way valve 121 is rotated again counterclockwise to the standby working position to reduce a dead volume of the system and increase the elution efficiency of the system.

As shown in FIG. 1, in addition to the two-dimensional liquid chromatographic analysis of the target components, the system in embodiment 1 can also perform one-dimensional and three-dimensional liquid chromatographic analysis without any modification or supplement to the system hardware, with strong flexibility and compatibility and wide applicability, and meanwhile, the analysis time of the next dimension is not limited by the collection and transfer time of the components in the previous dimension so that separation efficiency is higher. On the basis of embodiment 1, embodiment 2 removes the stator interface closed by the plug in the three-slot three-position ten-way valve and uses the three-slot three-position six-way valve as the collecting valve. The implementation mode of the present invention is further described, and the innovation of the circulating two-dimensional liquid chromatography of the present invention and the broad application prospects in the separation and analysis of complex components are fully illustrated.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A circulating multidimensional liquid chromatography, comprising an infusion device, a sampling device, a collecting-resampling device, a chromatographic column switching device and a detecting device which are connected sequentially;

wherein the collecting-resampling device comprises a collecting valve and a sample ring, and the collecting valve is connected with the sample ring;

the sampling device is successively connected with the collecting valve and the chromatographic column switching device;

the detecting device is also connected with the collecting valve;

the collecting valve is a three-slot three-position ten-way valve; a valve of the collecting valve has three working rotation positions; 10 interfaces are evenly distributed annularly on a valve stator; a surface of a rotor is provided with three folded or curved flow slots adjacent to each other; and coverage range of each flow slot comprises three contiguous stator interfaces;

one end of the sample ring is connected with the stator interface not covered by the flow slots in the collecting valve, which is denoted as a first interface, and other interfaces are numbered in a clockwise direction; the other end of the sample ring is connected with a sixth interface; the sixth interface is radially corresponding to the first interface; a third interface is connected with a waste liquid outlet; a fourth interface is connected with the detecting device; an eighth interface is connected with the chromatographic column switching device; a ninth interface is connected with the sampling device; the other interfaces are closed with plugs;

the chromatographic column switching device comprises a column switching valve and a plurality of chromatographic columns connected thereto; and the column switching valve is connected with the eighth interface and the detecting device respectively;

the column switching valve is a double-three-position three-way valve; center and edge of a valve stator of the double-three-position three-way valve are respectively provided with a center interface and an edge interface, respectively; an annular region between the center interface and the edge interface is evenly distributed with inner interfaces and outer interfaces used for connecting both ends of the chromatographic columns respectively; and the surface of a valve rotor 151 of the double-three-position three-way valve is respectively provided with an annular flow slot communicated with the center interface, one of the inner interfaces, one of the outer interfaces, and the edge interface respectively, and the annular flow slot is configured to be capable of keeping covering the edge interface during a rotation process of the valve rotor;

the valve stator of the column switching valve is distributed with 8 interfaces; the interface at the center of the valve stator is denoted as eleventh interface, the interface at the edge of the valve stator is denoted as twelfth interface, and the other interfaces are denoted as thirteenth interface-eighteenth interface respectively;

wherein the eleventh interface in the column switching valve is connected with the eighth interface in the collecting valve; the twelfth interface in the column switching valve is connected with the detecting device; and the other interfaces are connected with a plurality of chromatographic columns respectively.

2. The circulating multidimensional liquid chromatography according to claim 1, wherein the infusion device is composed of a plurality of connected liquid chromatographic pumps; and the liquid chromatographic pumps are multielement high pressure pumps, unit high pressure pumps or low pressure pumps.

3. The circulating multidimensional liquid chromatography according to claim 2, wherein the chromatographic columns are low pressure liquid chromatographic columns, normal pressure liquid chromatographic columns, high pressure liquid chromatographic columns or ultrahigh pressure liquid chromatographic columns.

4. The circulating multidimensional liquid chromatography according to claim 3, wherein the detecting device is an ultraviolet detecting device, a fluorescence detecting device, an evaporative light detecting device, a differential detecting device or a mass spectrometry detecting device.

5. An application of the circulating multidimensional liquid chromatography of claim 1 in detection of characteristic components and toxic and harmful substances.

* * * * *